W. F. NEAL.
Horse Hay-Rakes.
No. 155,745.
2 Sheets--Sheet 1.
Patented Oct. 6, 1874.
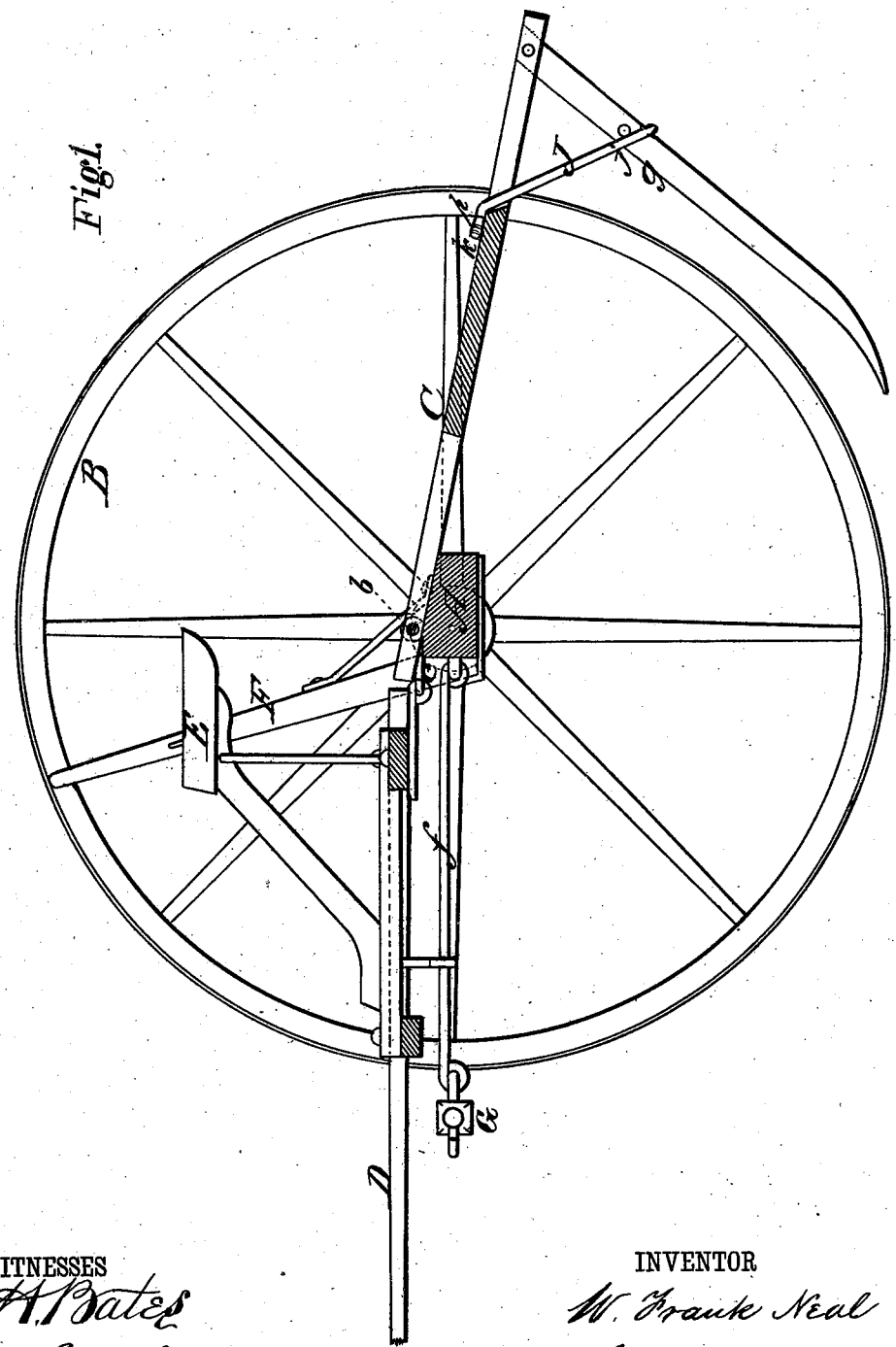
WITNESSES
INVENTOR

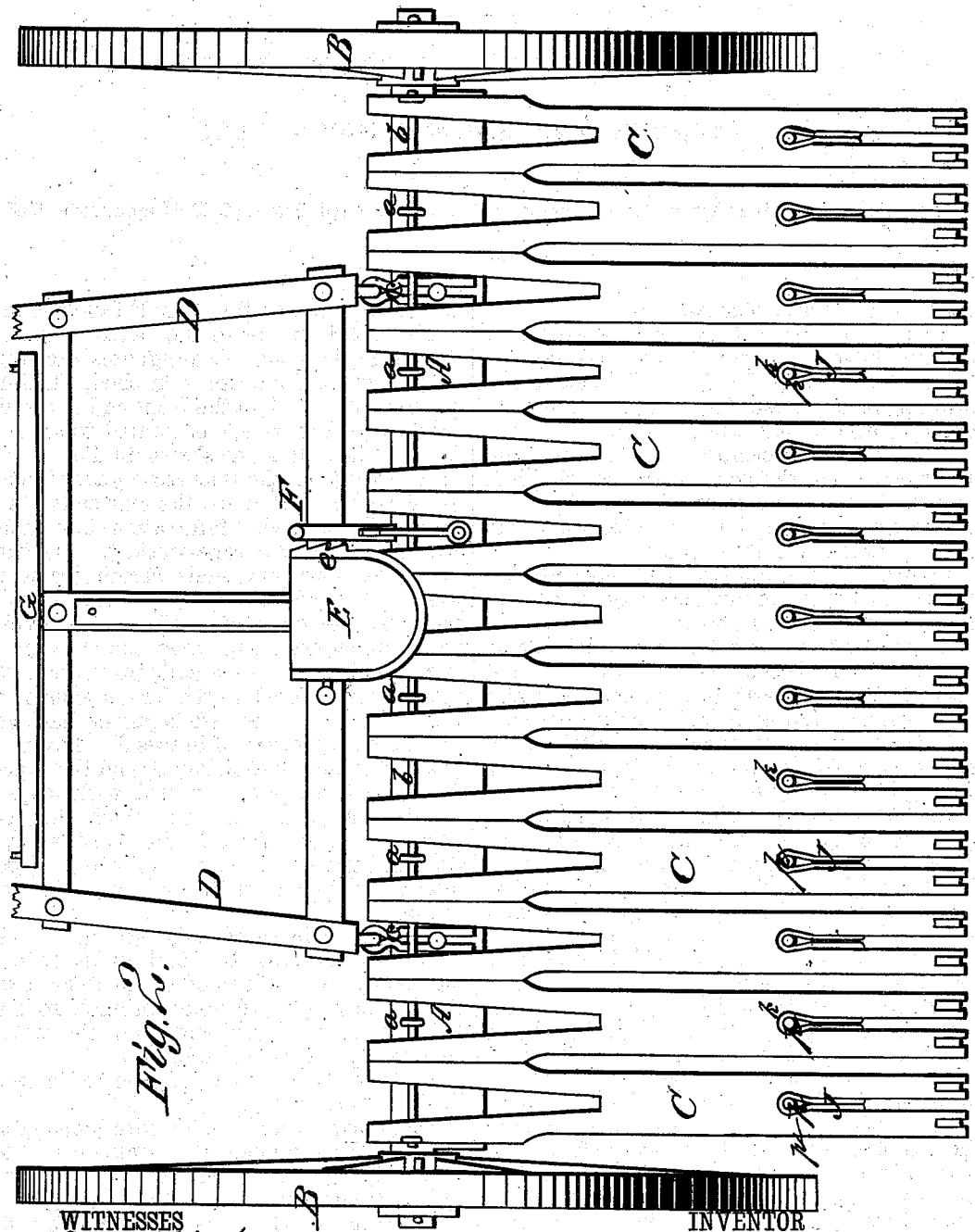

UNITED STATES PATENT OFFICE.

WILLIAM F. NEAL, OF LIBERTY, MAINE.

IMPROVEMENT IN HORSE HAY-RAKES.

Specification forming part of Letters Patent No. 155,745, dated October 6, 1874; application filed July 25, 1874.

*To all whom it may concern:*

Be it known that I, W. FRANK NEAL, of Liberty, in the county of Waldo and State of Maine, have invented a new and valuable Improvement in Horse Hay-Rake; and I do hereby declare that the following is a full, clear, and exact description of the construction and operation of the same, reference being had to the annexed drawings making a part of this specification, and to the letters and figures of reference marked thereon.

Figure 1 of the drawing is a representation of a sectional view of my horse hay-rake. Fig. 2 is a plan view of the same.

This invention has relation to wheel horse hay-rakes; and it consists in a novel mode of securing the rake-teeth to their bars, whereby the teeth are allowed to yield backward without breaking, should they meet with an obstruction which would be liable to break or derange the machine.

In the annexed drawings, A designates the axle of two transporting-wheels, B B, the upper side of which axle is beveled, as shown in Fig. 1, and has secured to it, at suitable distances apart, eye-bearings $a$, to which a rod, $b$, is secured. The rod $b$ has pivoted to it the rake-bars C, which will be more fully explained hereinafter. D D designate the thills, which are connected to the axle A by means of staple-shaped hinges $c$ $c$, which extend in front of the axle some distance, and are adjustably secured to it by means of clamping-screws, by loosening which the hinges can be extended more or less in front of the axle. E designates the driver's seat, which is mounted on the rear part of the thills, so that the weight of the driver, coming upon the hinges $c$ $c$, will, when these hinges are properly adjusted, tilt the axle A, and raise the rake-teeth free from the ground. On the right-hand edge of the driver's seat E teeth $e$ are formed, which are pitched backward, and during the raking operation a hand-lever, F, which is rigidly secured to the axle, bears against said teeth, and prevents the rakes from rising. When the driver releases the lever F from the teeth $e$, his weight will cause the rakes to rise and discharge the load. G designates the single-tree to which the horse is hitched, which single-tree is secured to the front end of a rod, $f$, the rear end of which is jointed to the front part of the axle A, as shown in Fig. 1. The bars C, to which the rake-teeth $g$ are attached, are forked at both ends, the rear ends of each bar having a second bifurcation, into each of which is pivoted a rake-tooth, $g$. The bifurcation at their front ends permits each arm thereof to yield inwardly when caused to expand by the absorption of moisture, and in this manner crowding upon the bar $b$ of the vibrating bars C is effectually prevented. The teeth $g$ are pivoted to the forked ends of the bars C, and sustained against backward movement by means of braces J. Two teeth, $g$, are attached to each bar C, and the brace J for these teeth is constructed with loops $j$ $j$ on its rear end, through which the teeth pass, and an eye, $k$, on its front end, which is attached to a pin, $p$, of wrought-iron of good quality, in the crotch of the rear bifurcation of bar C.

The pin $p$ is sufficiently strong to resist backward thrust of the tooth under ordinary circumstances; but should the tooth meet with an obstruction which would be liable to break it, the pin $p$ will yield and allow the tooth to pass safely over the obstacle.

What I claim as new, and desire to secure by Letters Patent, is—

The braces J, constructed with loops $j$ $j$ and an eye, $k$, and applied to the teeth $g$, and to a pin, $p$, on the upper side of bar C, substantially as specified.

In testimony that I claim the above I have hereunto subscribed my name in the presence of two witnesses.

WILLIAM FRANK NEAL.

Witnesses:
J. O. JOHNSON,
W. MITCHELL.